(12) United States Patent
D'Herin Bytner et al.

(10) Patent No.: US 11,353,408 B2
(45) Date of Patent: Jun. 7, 2022

(54) PROCESS FOR QUANTIFYING THE MOISTURE IN A FIBER BLANKET

(71) Applicant: SAINT-GOBAIN ISOVER, Courbevoie (FR)

(72) Inventors: Frédéric D'Herin Bytner, Paris (FR); Marc Roubin, Courthezon (FR); Fiona Soteras, Ancone (FR); Laure Cossalter, Saint Félix (FR); Michel Gaubil, Les Angles (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 44 days.

(21) Appl. No.: 16/630,244

(22) PCT Filed: Jul. 12, 2018

(86) PCT No.: PCT/FR2018/051766
§ 371 (c)(1),
(2) Date: Jan. 10, 2020

(87) PCT Pub. No.: WO2019/012232
PCT Pub. Date: Jan. 17, 2019

(65) Prior Publication Data
US 2021/0096087 A1    Apr. 1, 2021

(30) Foreign Application Priority Data
Jul. 13, 2017    (FR) ..................................... 1770753

(51) Int. Cl.
*G01N 22/04*    (2006.01)
(52) U.S. Cl.
CPC .................... *G01N 22/04* (2013.01)

(58) Field of Classification Search
CPC ........................................................ G01N 22/04
See application file for complete search history.

(56) References Cited

U.S. PATENT DOCUMENTS 6,260,415 B1 *   7/2001   Goebel .................... G01D 5/48
                                                            73/582
6,363,695 B1 *   4/2002   Mykkanen ............ B65B 7/2892
                                                            53/485

(Continued)

FOREIGN PATENT DOCUMENTS

WO    WO 2006/023137 A2    3/2006

OTHER PUBLICATIONS

Kupfer, K., "Microwave Moisture Measurement Systems and Their Applications," Jan. 2000, Sensors Update—Special Topic: RF & Microwave Sensing of Moist Materials, Wiley-VCH, pp. 343-376, XP002639590, ISBN: 978-3-527-29821-1.

(Continued)

*Primary Examiner* — Christopher P McAndrew
*Assistant Examiner* — Zannatul Ferdous
(74) *Attorney, Agent, or Firm* — Pillsbury Winthrop Shaw Pittman LLP

(57) ABSTRACT

A process for quantifying the moisture in a blanket of fibers includes the emission of an incident electromagnetic wave towards the blanket, by at least one emitter; the receiving of the electromagnetic wave transmitted through the blanket, by at least one receiver; the identification of a variation of at least one parameter of the transmitted wave relative to the incident wave; the determination of a representative value of moisture in the blanket of fibers, as a function of the variation and of the effective volume of blanket that has actually interacted with the incident wave.

22 Claims, 4 Drawing Sheets

(56) References Cited

U.S. PATENT DOCUMENTS

| | | | | |
|---|---|---|---|---|
| 2003/0214399 | A1* | 11/2003 | Naruse | G01K 1/026 340/531 |
| 2012/0144868 | A1 | 6/2012 | Mirth et al. | |
| 2013/0187246 | A1* | 7/2013 | Adkisson | H01L 23/481 257/416 |
| 2015/0320588 | A1* | 11/2015 | Connor | A61F 7/0085 607/107 |
| 2018/0283171 | A1* | 10/2018 | Bhongale | E21B 47/07 |
| 2019/0318884 | A1* | 10/2019 | Hayakawa | H01G 11/84 |
| 2020/0230008 | A1* | 7/2020 | Newham | A61B 5/053 |

OTHER PUBLICATIONS

International Search Report and issued in International Patent Application No. PCT/FR2018/051766, dated Oct. 11, 2018.

* cited by examiner

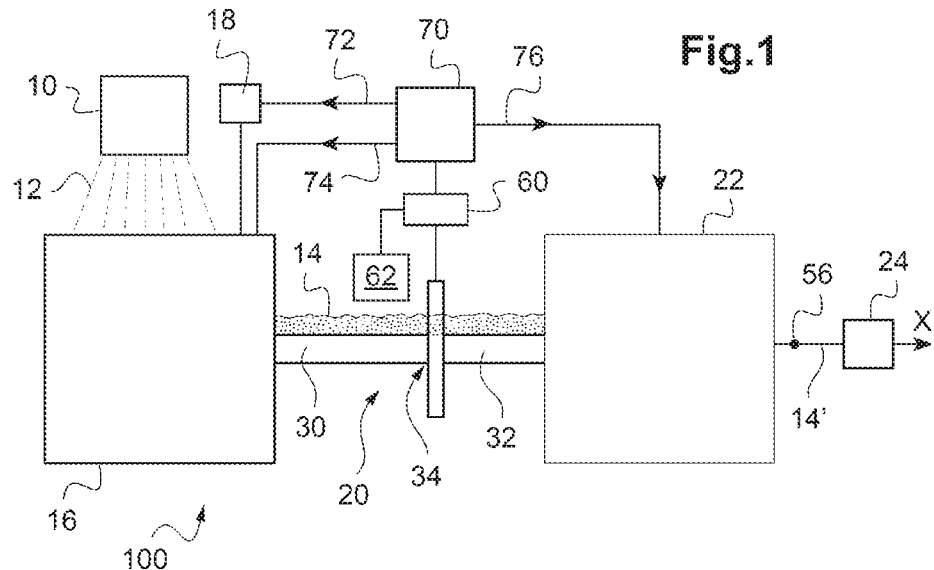
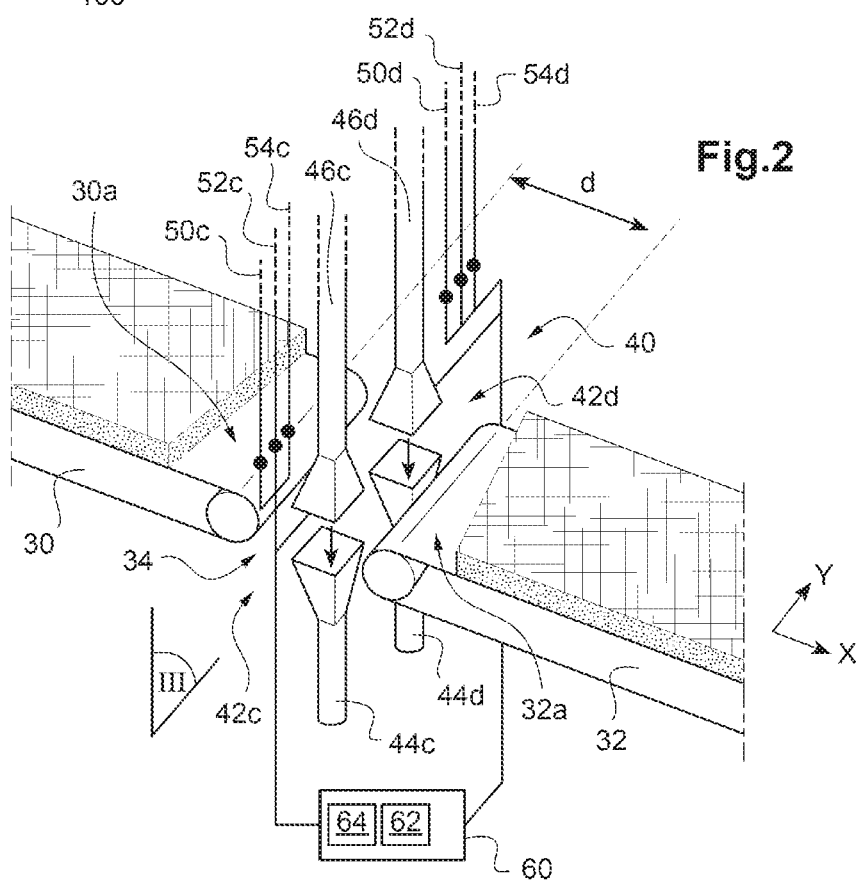

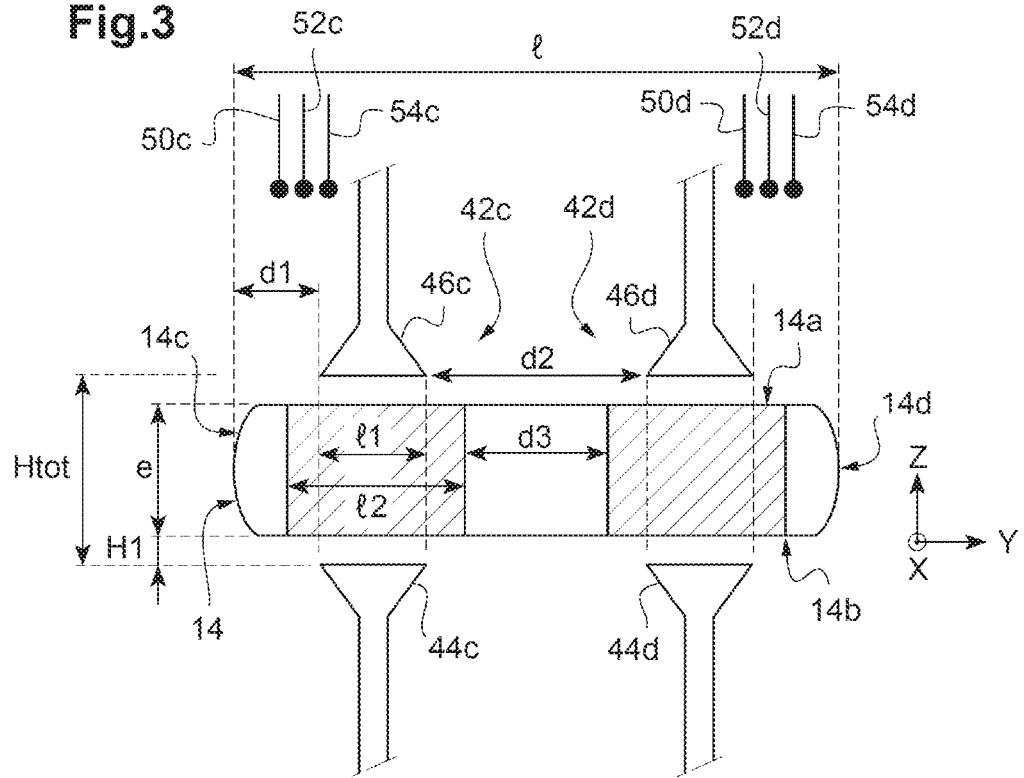
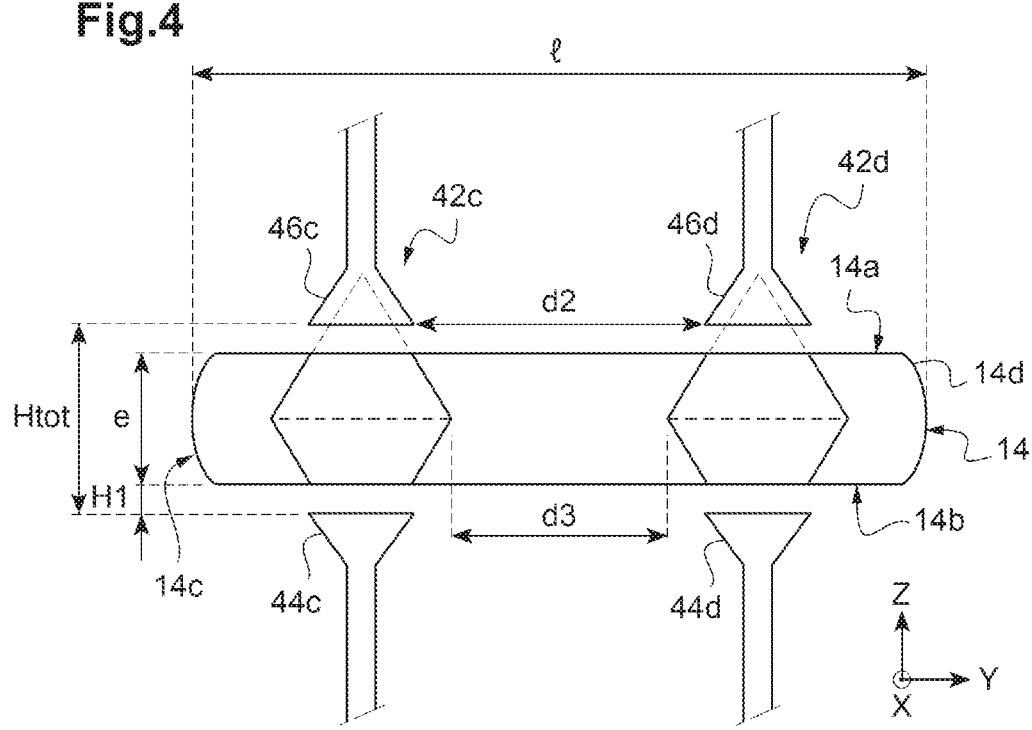

PROCESS FOR QUANTIFYING THE MOISTURE IN A FIBER BLANKET

CROSS-REFERENCE TO RELATED APPLICATIONS

This application is the U.S. National Stage of PCT/FR2018/051766, filed Jul. 12, 2018, which in turn claims priority to French patent application number 1770753 filed Jul. 13, 2017. The content of these applications are incorporated herein by reference in their entireties.

The invention relates to products based on fibers, in particular based on mineral or plant fibers, for example rock, glass, cotton, wood or hemp fibers, and in particular such products manufactured using a blanket of fibers bound by a binder.

The invention relates, more specifically, to a process for quantifying the moisture in such a blanket of fibers, and to a process for manufacturing a product based on fibers bound by a binder, using said process.

Insulation products currently marketed typically consist of panels, boards, rolls or products of tubular or other shape obtained from a blanket of fibers, for example of mineral fibers such as glass fibers or rock fibers, consolidated by an organic or mineral binder.

The process for manufacturing such a blanket of fibers is well-known and generally comprises the following series of steps:
  the melting of the mineral material,
  the conversion into fibers also referred to as fiberizing, for example by a so-called rotary fiberizing technique using rotational fiberizing members,
  the addition of a binder to the fibers,
  the collection of the fibers impregnated with the binder customarily in a receiving chamber comprising, on the opposite side from the fiberizing device, a conveyor equipped in the lower part thereof with suction boxes maintained under vacuum,
  the conveying of the fibers on a receiving surface, in the form of a thicker or thinner layer referred to as a blanket,
  generally a crosslinking or polymerization heat treatment, carried out in a drying oven, intended to give the blanket its cohesion,
  a final preparation of the resulting products.

Within the context of monitoring the manufacturing process as has just been described, it is necessary to continuously carry out monitoring procedures, over at least one part and preferably over the whole of the production, in order to guarantee a good quality of the blanket.

Patent application WO 2006/023137 describes for example a process for monitoring the process based on a measurement by spectroscopic means of the moisture present in the blanket of fibers impregnated with the binder, before the crosslinking heat treatment of the binder in the drying oven. By comparing the measured moisture content with a reference value, the adjustment of at least one parameter allows continuous monitoring of the process.

It should be noted that the importance and need for an effective monitoring process in the processes for manufacturing blankets of mineral fibers are further increased currently due to the desire to develop, as a replacement for the phenol-formaldehyde resins used today, alternative binders that make it possible to reduce the risks of release of formaldehyde during the curing of the binder. Within this context, binders of different chemical nature, in particular obtained from polycarboxylic polymers and polyols such as acrylic resins, for example as described in application WO 2006/023137, are currently being studied.

With these alternative binders, even more than with the phenol-formaldehyde binders, the monitoring and optimization of the amount of water and the distribution thereof in the uncured product is essential for control of the process in order to guarantee the desired quality in the final product.

Specifically, in order to prevent a polymerization and too premature a setting of the alternative binders and in order to reduce the viscosity thereof, it is necessary to substantially increase, compared to phenol-formaldehyde binders, the proportion of water present in the solution added to the fibers, which results in increased difficulties regarding the elimination of the residual water potentially present in the finished product on leaving the line, and thus makes the presence of precise monitoring means even more essential.

The objective of the present invention is to improve the precision of the monitoring operations and regulation on the lines for manufacturing products based on fibers bound by a binder, so as to guarantee an optimal quality of the final product.

Firstly, one subject of the invention is a process for quantifying the moisture in a blanket of fibers, in particular a blanket of fibers moving along a run plane (X, Y) and a run direction (X), comprising:
  the emission of an incident electromagnetic wave towards the blanket, by at least one emitter,
  the receiving of the electromagnetic wave transmitted through the blanket, by at least one receiver,
  the identification of a variation of at least one parameter of the transmitted wave relative to the incident wave,
  the determination of a representative value of the moisture in the blanket of fibers, as a function of said variation and of the effective volume of blanket that has actually interacted with the incident wave.

An electromagnetic wave passing through a blanket of fibers sees some of its parameters modified during this crossing. These modifications are a function of the actual amount of water, of glass and of binder encountered by the wave, and, to a lesser extent, of the ambient temperature and of the ambient humidity.

By taking into account, in the moisture calculations, the effective volume of the blanket that has actually interacted with the incident wave, it is possible to determine with great precision the amount of water in the blanket, and therefore to more effectively regulate the parameters of the blanket manufacturing process in order to ensure that all the water is eliminated from the final product. For products of the aforementioned alternative binder type, more particularly, precise management of the moisture upstream of the drying oven also makes it possible to improve the intrinsic qualities of the final product, in particular the mechanical properties thereof.

The incident electromagnetic wave is typically, but non-limitingly, a microwave, i.e. a wave having a frequency between 1 and 300 GHz.

The incident electromagnetic wave is preferably a wave having a frequency between 1 and 50 GHz, more preferentially still between 1 and 10 GHz.

According to one implementation example, a variation of one parameter of the transmitted wave relative to the incident wave is a phase shift.

According to another example, a variation of one parameter of the transmitted wave relative to the incident wave is a change in amplitude.

According to one example, the representative value of moisture in the blanket of fibers corresponds to the actual amount of water (for example expressed in kg) that has interacted with the incident wave (when passing through the blanket), referred to below as effective amount of water.

According to one example, the process further comprises a measurement of a representative value of the grammage of the blanket, advantageously downstream of the drying oven and preferably at the end of the line, on the final product. The grammage is understood to mean the mass of glass and binder per unit of area. The value representative of the grammage is understood to mean the grammage or any value that makes it possible to obtain information on this grammage.

According to one example, the process further comprises a measurement of the thickness of the blanket, occasionally or advantageously in real time and continuously, preferably in line with the emitter or nearby.

According to one example, the determination of a representative value of moisture in the blanket of fibers is a function of the identified variation of the wave, of the grammage and of the thickness of the blanket.

The effective amount of water is for example determined by means of a mathematical relationship giving the variation of one parameter of the transmitted wave relative to the incident wave as a function of at least the effective amount of water, the grammage, and the thickness of the blanket, the coefficients of said relationship being determined previously by regression from a series of measurements carried out with samples of known or measured relative humidity, thickness and grammage, the effective amount of water being a function of the effective volume of blanket that has actually interacted with the incident wave.

According to one embodiment, the effective amount of water is approached by a relationship of the type:

$$F = a \cdot H + b \cdot G + c \cdot E + \delta \quad (1)$$

with:
F being the variation of the wave
H being the effective amount of water (in kg)
G being the grammage (in kg/m$^2$)
E being the thickness (in m)
the coefficients a, b, c, δ being determined previously by linear regression from a series of measurements carried out with samples of known or measured relative humidity, thickness and grammage, the effective amount of water being a function of the effective volume of blanket that has actually interacted with the incident wave.

According to another embodiment, the amount of water may be approached by a non-linear (polynomial, exponential, etc.) regression.

More specifically, the effective amount of water is calculated from the relative humidity, the grammage, the thickness and, in accordance with the invention, the effective volume of blanket that has actually interacted with the incident wave, according to the following relationship:

$$H = Hr \cdot (G/E)/(1-Hr) \cdot V_{eff} \quad (2)$$

with:
H being the effective amount of water (in kg)
Hr being the relative humidity (in %)
G being the grammage (in kg/m$^2$)
E being the thickness of the blanket (in m)
Veff being the effective volume (in m$^3$)

According to one advantageous example, the moisture quantification process further comprises a measurement of the ambient temperature and/or ambient humidity. In other words, the ambient temperature and/or the ambient humidity is/are measured, preferably in the vicinity of the emitter, and a representative value of moisture in the blanket of fibers is determined also as a function of this/these temperature and/or humidity value(s). The effective amount of water is in this case determined by means of a relationship of the type:

$$F = a' \cdot H + b' \cdot G + c' \cdot E + d' \cdot T + e' \cdot Ha + \delta' \quad (1')$$

with:
F being the variation of the wave
H being the effective amount of water (in kg)
G being the grammage (in kg/m$^2$)
E being the thickness (in m)
T being the ambient temperature
Ha being the ambient humidity According to one example, the process comprises a prior calibration step for establishing a relationship between the variation of one parameter of the transmitted wave relative to the incident wave and an actual amount of water interacting with an incident electromagnetic wave passing through the blanket, referred to as effective amount of water, said relationship taking into account the effective volume of blanket that has actually interacted with the incident wave.

Typically, the calibration step consists in analyzing a plurality of samples of fibrous material while determining, for each:
  the relative humidity, the grammage, the thickness,
  a variation (phase shift and/or variation in amplitude of the wave in particular) of at least one parameter of an electromagnetic wave passing therethrough,
  the effective volume of fibrous material actually passed through by the wave,
then in determining, by multiparameter regression (for example linear regression), a relationship in particular of type (1) or (1') above between the variation of the wave, the grammage, the thickness, and the effective amount of water, the effective amount of water being calculated from the relative humidity, the grammage, the thickness and, in accordance with the invention, the effective volume of blanket that has actually interacted with the incident wave.

Advantageously, said relationship may also take into account the ambient humidity and/or the ambient temperature.

According to one example, the calibration step comprises a step of estimating, by tests or by numerical simulation, the effective volume of blanket interacting with the electromagnetic wave.

The effective volume of the blanket is defined by the thickness of the blanket and by an effective blanket cross section, defined preferably at each point of the thickness (in each plane of the blanket parallel to the main faces of the blanket), corresponding to the cross section that interacts with the electromagnetic wave.

Thus, the step of estimating the effective volume of blanket advantageously comprises a step of estimating the effective blanket cross section interacting with the electromagnetic wave.

The thickness of the blanket may be the nominal thickness of the blanket, known beforehand as a parameter of the manufacturing line, or a thickness measured on a sample.

The effective cross section may be estimated by numerical simulation, or by experimental tests.

It depends:
  on the relative position of the emitter and of the receiver,
  on the position of the blanket between the emitter and the receiver, and
  on the thickness of the blanket.

During the calibration step, one or other of these parameters or all three may be taken into account.

It has been observed that the effective cross section is typically rectangular.

The effective volume may have a constant cross section over the entire thickness of the blanket.

The effective volume may also have a variable cross section over the entire thickness of the blanket. In this case, the effective cross section gradually increases over at least one portion of the thickness of the blanket: the effective volume is flared from the emitter towards the receiver, over at least one portion of the thickness of the blanket. The effective volume typically has a general truncated cone or double truncated cone shape. It should be noted that the term cone is understood here to mean a cone of revolution, a pyramidal cone or any cone. Preferably, the directrix curve of the cone is overall a scalant of the contour of the emitting surface (hereinafter useful surface) of the emitter.

According to one example, the effective cross section is estimated by experimental tests of "blotting paper" type, consisting in placing, between the emitter and the receiver, at least one flat fibrous sample—also referred to as blotting paper—of which the dimensions (transverse dimensions, i.e. typically length and/or width dimensions for example in the case of a rectangle) are varied, in observing for each configuration of the sample a characteristic variation of at least one parameter of the transmitted wave relative to the incident wave (evolution of the phase shift or of the change in amplitude of the wave for example), and in deducing therefrom the maximum dimensions of the sample(s) for which there is an evolution of said parameter of the wave (referred to as effective cross section).

Preferably, a plurality of stacked samples are placed between the emitter and the receiver, and the dimensions of each sample are gradually modified, one sample after the other, while each time observing a characteristic variation of the wave in order to determine for each sample the maximum cross section for which there is an evolution.

It has been determined experimentally that the effective volume is advantageously approximated by a succession of truncated cones placed between the emitter and the receiver, said succession of truncated cones comprising at least two truncated cones, the large bases of which are coincident with one another (forming a common large base). According to one particular arrangement, these two cones are symmetrical with respect to their large bases (their common large base) and their large bases are equidistant (their common large base is equidistant) from the emitter and from the receiver.

If it is desirable to obtain a relative humidity value, the process may further comprise a step of recalculating the relative humidity of the blanket (in other words the ratio expressed in % of the mass of water contained in a sample of blanket to the total mass of this sample), taking into account the effective amount of water and an effective volume of the blanket that has interacted with the incident electromagnetic wave.

The relative humidity is then obtained by the formula:

$$Hr=H/[H+(G/E) \cdot V_{eff}] \quad (3)$$

with:
Hr being the relative humidity (in %)
H being the effective amount of water (in kg)
G being the grammage (in kg/m$^2$)
E being the thickness of the blanket (in m)
Veff being the effective volume (in m$^3$)

According to one implementation example, the blanket of fibers is transported by a first transport member and by a second transport member separated from the first member by a measuring zone, and the emitter and the receiver are positioned respectively above and below the blanket, in said measuring zone.

For the entire remainder of the description, a lateral direction Y is defined as the direction orthogonal to the run direction X of the blanket and parallel to the run plane. A transverse direction Z is orthogonal to X and Y.

Subsequently, a length is measured in the run direction X and a width in said lateral direction Y. A height or a thickness is measured in the transverse direction Z.

According to one example, at least two measuring subassemblies each comprising an emitter and a receiver are distributed in the lateral direction of the blanket, preferably on either side of a median plane of the blanket, in other words a plane orthogonal to the run plane and passing through the middle thereof.

Advantageously, the space between the emitters of two adjacent measuring subassemblies is chosen in order to prevent interferences.

Furthermore, advantageously, each measuring subassembly is preferably located at a distance from one lateral end of the blanket equal to at least one times the maximum transverse dimension of the emitter, more preferentially still 1.5 times this maximum transverse dimension. If for example the emitter has a rectangular cross section, it is preferably located at a distance from the lateral edge of the blanket at least equal to the length of its diagonal, more preferentially still at least equal to 1.5 times the length of its diagonal.

According to one possible configuration, three measuring subassemblies each comprising an emitter and a receiver are distributed over the width of the blanket, preferably with one subassembly aligned with the median plane of the blanket and the two others located on either side of said median plane.

According to another possible configuration, provision may be made to position measuring subassemblies that are regularly spaced out over the entire width of the blanket, for example spaced out by a distance equal to 60 cm.

The location of the wet points in the width of the loft makes it possible either to be able to monitor the parameters of the process upstream in a targeted manner in order to locally adjust the properties of the blanket, or to select downstream parts of product to be scrapped. Specifically, on leaving the drying oven, a blanket is typically cut into two or four strips of equal width respectively at half or a quarter of the width of the blanket. The knowledge of the wet points of the blanket over its width makes it possible to scrap only the strip(s) judged to be defective.

Optionally, the process comprises the determination of a moisture difference between at least two zones of the blanket that are aligned in the lateral direction, preferably two zones located on either side of the median plane of the blanket.

The invention also relates to a process for manufacturing a product based on fibers bound by a binder, comprising a fiberizing step, a step of adding the binder, a step of collecting and conveying binder-impregnated fibers, and a step of crosslinking the binder, the process further comprising, before the crosslinking step, a step of quantifying the moisture in the blanket of fibers, using the process described above.

According to one example, the manufacturing process further comprises a feedback loop acting on one of the parameters of said process as a function of the quantified moisture of the blanket.

For example, the process further comprises a step of regulating at least one parameter chosen from the composition of the binder and in particular the proportion of water in the binder, the amount of binder, the crosslinking temperature, the duration of the crosslinking step, or a speed or flow rate of air imposed during the crosslinking step, as a function of the quantified moisture of the blanket.

The fibers are for example mineral fibers, in particular glass or rock fibers, or plant fibers, in particular wood, cotton or hemp fibers.

The details of the invention will be better understood on reading the following description of an implementation of the present process within equipment for manufacturing a mineral wool blanket. Within the context of the present invention, other embodiments are of course possible, the following description being provided solely by way of illustration and not to be considered as limiting in any of the aspects thereof described.

FIG. 1 represents an overview of equipment for manufacturing a mineral wool blanket, incorporating the present invention.

FIG. 2 is a more detailed schematic view of the conveying means of the equipment from FIG. 1.

FIG. 3 is a cross-sectional view along the plane III from FIG. 2.

FIG. 4 illustrates a variant of modeling an effective volume of the blanket.

Figure 5:
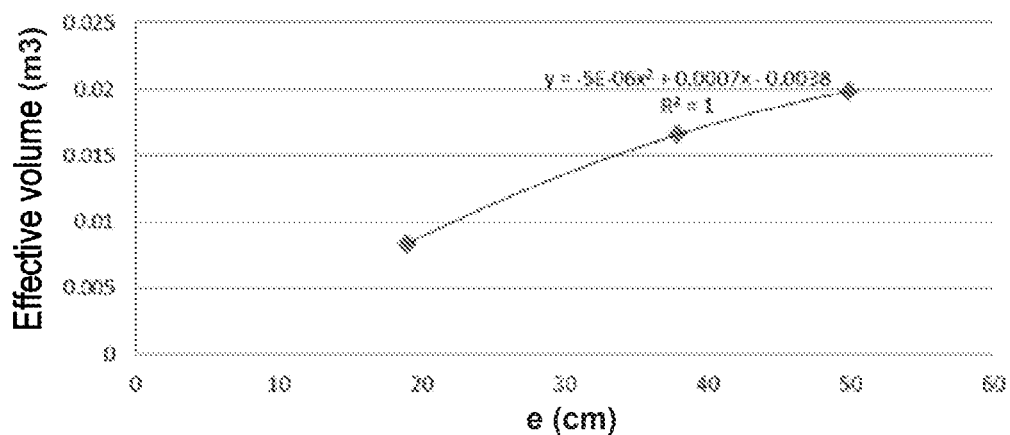
FIG. 5 represents test results in the form of a curve giving the volume determined by the blotting paper method as a function of the thickness of the blanket, for a given emitter/blanket/receiver positioning.

Represented schematically in FIG. 1 is equipment 100 for manufacturing products based on fibers, in particular based on a mineral wool blanket.

The equipment comprises a device 10 of known technology, enabling the fiberizing of the rock or of the glass.

According to a well-known process, a binding compound or binder is sprayed onto the fibers 12 thus obtained, in a receiving chamber 16, by dedicated means 18 for mixing and injecting the various constituents (resin, water, adjuvants, etc.). Next the fibers are collected in the form of a blanket or ply 14, in the receiving chamber 16, on a conveyor equipped in the lower part thereof with suction boxes maintained under vacuum (not represented).

The fiber blanket 14 is then sent by conveying means 20 into a drying oven 22, where the temperature of the air is for example of the order of 300° C., with a temperature at the core of the blanket close to 250° C.

In the drying oven, the excess water is evaporated and the binder is polymerized.

The fiber blanket 14' thus obtained is then transported to a unit 24 for final preparation of the resulting products, comprising for example a cutting of the blanket so as to obtain blocks which will then be able to be arranged as boards or in a roll, and optionally the packaging of the boards or rolls thus obtained, for example the wrapping thereof by a plastic film.

According to the invention, the moisture in the blanket is quantified precisely upstream of the crosslinking drying oven 22.

This moisture quantification is carried out by an automated device 40 described in greater detail subsequently with reference to FIGS. 2 and 3, advantageously positioned level with the conveying means 20.

In the example illustrated, the moisture quantification device comprises two measuring subassemblies 42c (on the left) and 42d (on the right), that make it possible to quantify the moisture at the two lateral ends of the blanket. The invention will subsequently be described more particularly with reference to one of these subassemblies 42c. The whole of the corresponding description can obviously be transposed to the second subassembly 42d.

It will furthermore be noted that, according to one variant, the device could also comprise a higher number of subassemblies 42a . . . 42n, distributed over the width of the blanket 14.

As illustrated in FIG. 2, the conveying means 20 comprise a first and a second transport member 30, 32 in the form of endless belts mounted around parallel axes, and driven by a motor. Each one comprises a main face respectively 30a, 32a, here an upper face, intended to support the mineral fiber blanket 14. These could, in an equivalent manner, be chain conveyors or roller table conveyors or any other suitable transport means.

The first and second conveyors 30, 32 are spaced apart from one another, and separated, in the run direction X of the blanket, by a measuring zone 34.

The space between the first transport member and the second transport member is referenced d in FIG. 2. It is typically between 10 and 30 cm.

The fiber blanket 14 is overall in the form of a continuous strip having two parallel main faces 14a, 14b, one of which (14b) is in contact with the conveyors 30, 32. It has a width l (for example between 1 and 3 meters) and a thickness e (for example between 10 and 60 centimeters), as illustrated in FIG. 3.

At any point of the blanket, a run plane is defined tangent to one of the main faces thereof 14a, 14b.

Furthermore, locally a lateral direction Y is defined as the direction orthogonal to the run direction X of the blanket and parallel to said run plane at the same point.

In the example illustrated, the measuring subassembly 42c (on the left in FIGS. 2 and 3) comprises, in the measuring zone 34:

- an emitter 44c positioned below the blanket 14 (facing the lower face 14b in the figures), in the vicinity of a lateral edge 14c of the blanket, in particular at a distance d1 from this edge, typically of the order of 50 cm, preferably equal at least to one times the diagonal of the emitter, or even 1.5 times,
- a receiver 46c positioned on the opposite side of the blanket (facing the upper face 14a in the figures)
- an ambient temperature sensor 50c,
- an ambient humidity sensor 52c, and
- a blanket thickness sensor 54c.

A grammage sensor 56 is additionally provided downstream of the crosslinking drying oven, for measurement on the finished product (see FIG. 1).

FIG. 3 is a cross section along the plane III from FIG. 2, illustrating the aforementioned arrangements.

The emitter 44c is suitable for emitting an incident microwave towards the blanket.

The receiver 46c is placed facing the emitter 44c. It is therefore aligned with the emitter 44c, in a direction orthogonal to the run plane of the blanket.

It will be noted that although, in the example illustrated, the emitter is below the blanket and the receiver above, an inverted configuration is also possible.

The distance Htot between emitter and receiver is typically of the order of 50 to 100 cm, preferably between 70 and 100 cm, for example between 90 and 100 cm.

The distance H1 between the lower face of the blanket and the emitter is for example between 0 and 10 cm.

The receiver $46c$ is suitable for receiving the transmitted wave leaving the blanket and, in the example, for identifying a variation of a parameter of the wave, such as a phase shift or a variation in amplitude.

As illustrated in FIG. 2, the receiver $46c$, the temperature sensor $50c$, the humidity sensor $52c$, the blanket thickness sensor $54c$ and the grammage sensor are connected to a data processing unit 60, for example a computer, the operation of which will be described in greater detail subsequently.

The data processing unit 60 comprises or is connected to calibration data 62, which establish a relationship between a phase shift of the wave emitted by the emitter $44c$ and/or a variation of the amplitude thereof, and the amount of water that has interacted with the wave (effective amount of water).

The calibration data 62 are determined during a prior calibration step, typically comprising the following steps:

Step 1: a plurality of samples of fibrous material of known or measured grammage and thickness is provided This step is carried out, based on products, in limited ranges of defined thickness and defined grammage.

Step 2: the relative humidity of these samples is determined experimentally

An example of the protocol is described below:
1) a sample of around 50 to 80 g is withdrawn,
2) the whole sample is introduced into a hermetically sealed plastic bag in order to avoid moisture fluctuations linked to evaporation,
3) the sample is removed from the bag then its weight M1 (or initial weight) is weighed, preferably with an accuracy of 0.01 gram,
4) the sample is placed in a ventilated oven, for 1 h±5 min at 105° C.±2° C.,
5) the sample is removed from the oven and dried for 30 minutes in a desiccator,
6) the sample is weighed once more in order to determine its weight M2,
7) the relative humidity Hr, expressed in percent, is calculated by the formula:

$$Hr=(M1-M2)/M1 \cdot 100 \qquad (3)$$

Step 3: Each sample is subjected to the radiation of an incident electromagnetic wave and a variation of at least one parameter of the wave transmitted by the sample relative to the incident wave is identified Step 4: The effective volume of each sample is estimated The effective volume is a function of the height of the blanket and of the effective cross section of the blanket actually interacting with the wave.

The height of the blanket is for example measured in real time, by a height sensor.

The effective cross section may, itself, be modeled as will be described below:

A microwave emitter typically has a cross section of square shape, with a width $\ell 1$. As a variant, however, the emitter may have a cross section of any shape.

If the emitter $44c$ in FIG. 3 is considered, the blanket volume of which the cross section corresponds to that of the emitter is defined by broken lines. It is a rectangular parallelepiped with a base $\ell 1 \times \ell 1$ and a height e, corresponding to the thickness of the blanket.

In reality, it has been observed that the incident wave interacts with zones of the blanket 14 located outside of this volume.

It could for example be considered that the effective cross section is constant over the thickness of the blanket, that it is of the same geometric nature as the cross section of the emitter, but that it is an enlargement thereof, as illustrated in FIG. 3.

The effective cross section of the blanket, having a width $\ell 2 > \ell 1$, may be estimated by blotting paper type measurements as defined below:

Starting from the assumption above that the effective cross section of the blanket is constant over the entire thickness of the blanket, it is for example possible to determine this cross section by successively placing, between the emitter and the receiver, flat fibrous samples—also referred to as blotting papers—(which are plastic-coated in order to prevent evaporation) having a thickness equal to the thickness of the blanket but having increasingly large lateral dimensions. By observing the evolution of the phase shift or of the change in amplitude of the wave (or of any other characteristic variation), it is possible to determine the maximum cross section for which there is an evolution of one of the characteristics of the wave (referred to as effective cross section). It is understood that for any sample having a greater cross section than this effective cross section, the wave interacts with the blanket only over the portion of the sample corresponding to this effective cross section, but not with the rest of the sample. Although the sample is of larger size, the amount of water passed through by the wave therefore remains the same.

Preferably, and in particular in the cases where the distance Htot between emitter(s) and receiver(s) is greater than a predetermined value typically equal to 60 cm, the effective volume will be estimated by considering the effective cross section as being variable over the thickness of the blanket.

In this case, the effective cross section is estimated in a plurality of planes parallel to the main faces of the blanket: a plurality of samples is positioned in layers, between the emitter and the receiver, then the dimensions of each sample are gradually varied, one sample after the other, while each time observing the evolution of the phase shift or of the change in amplitude of the wave (or of any other characteristic variation) in order to determine for each sample the maximum cross section for which there is an evolution.

Figure 7A:
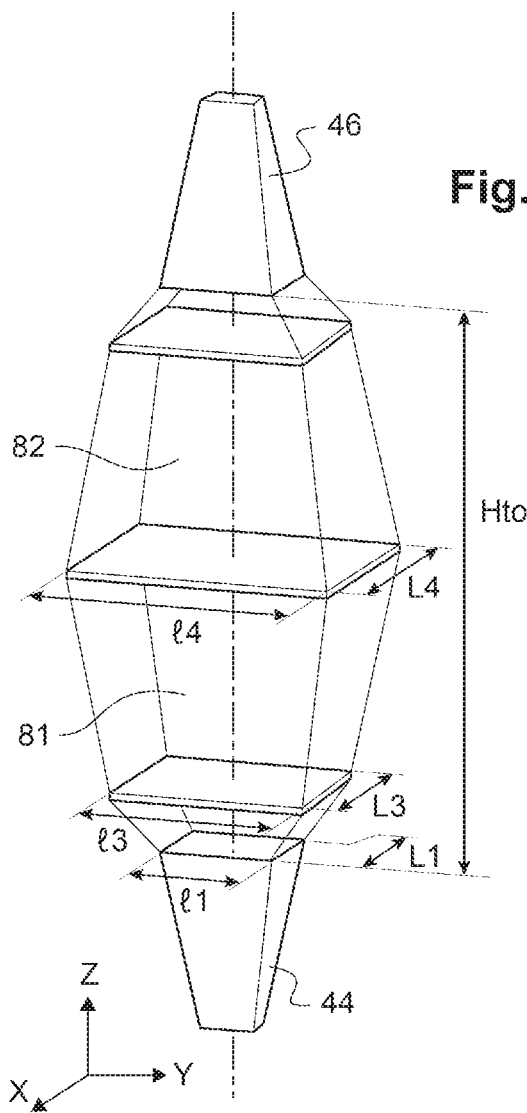
FIGS. 7A and 7B illustrate (respectively in perspective and as a view along the run direction X) the effective volume estimated during tests of the "blotting paper" type in a given configuration.
Figure 7B:
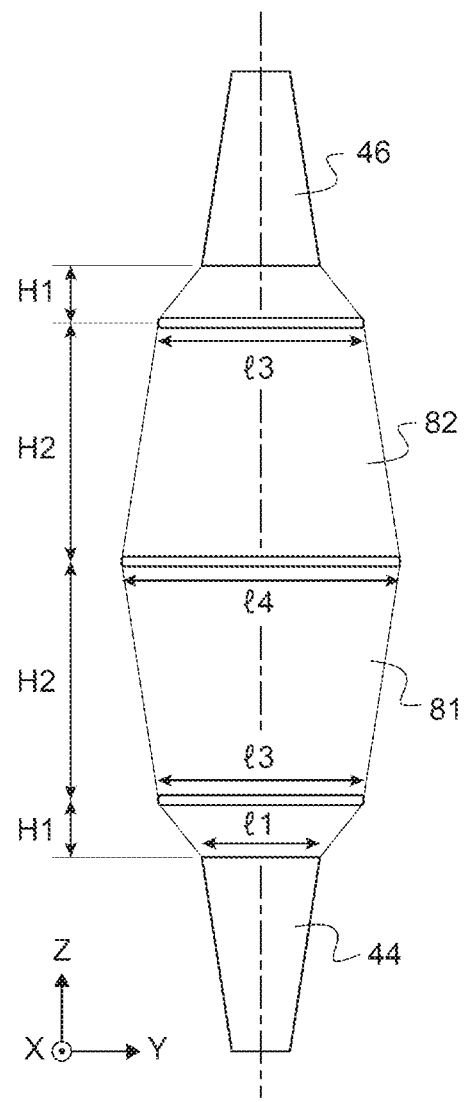

It has been observed that an optimal modeling of the effective volume consists of a double truncated pyramid as illustrated in FIG. 4 or else in FIGS. 7A and 7B.

It should be noted that the volume depends on the thickness of the blanket on the one hand, and on the relative distance between the emitter and the receiver and the spacing thereof relative to the blanket on the other hand.

FIGS. 7A and 7B give the results obtained by "blotting paper" type tests described previously, in a given line configuration.

In this particular configuration, the emitter and the receiver are spaced apart by a distance Htot equal to 96 cm.

The emitter and the receiver have opposite useful surfaces which are rectangular, having a width $\ell 1$ equal to 92 cm (measured in the lateral direction) and a length L1 equal to 125 cm (measured in the run direction).

In the example, the distance H1 between the lower face of the blanket and the useful surface of the emitter is equal to 10 cm.

The volume passed through by the incident wave is approximated by a double truncated pyramid with rectangular bases that is centered about one and the same transverse axis parallel to the axis Z connecting the emitter and the receiver.

In the example, this double truncated pyramid is broken down in the following manner:
A first truncated pyramid 81 having a height H2 equal to 38 cm, of which
the small base is coincident with the lower face of the blanket (and therefore parallel to the main faces 30*a*, 32*a* of the conveyors 30, 32) and has a width $l3$ equal to 20 cm and a length L3 equal to 15 cm
the large base has a width $l4$ equal to 28 cm and a length L4 equal to 21 cm.
A second truncated pyramid 82, having the same dimensions as the first pyramid, the first and second pyramids being symmetrical relative to their common large base.

FIG. 5 represents test results in the form of a curve giving the volume determined by the blotting paper method as a function of the thickness of the blanket, for a given emitter/blanket/receiver positioning.

Figure 6:
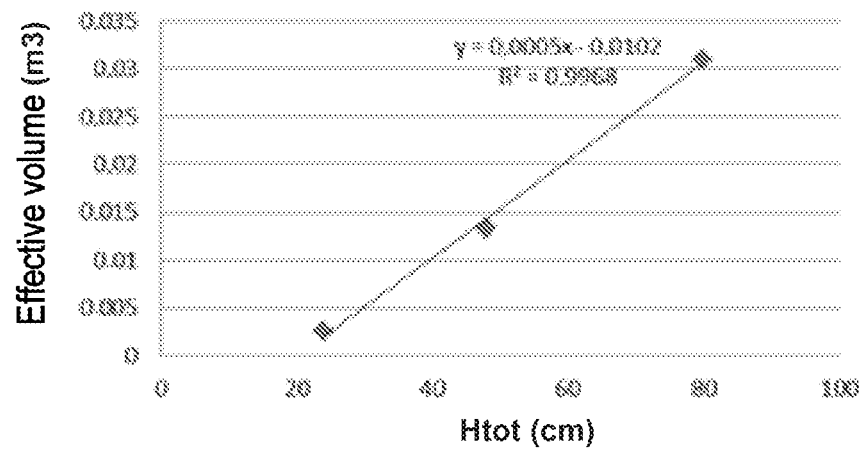
FIG. 6 represents test results in the form of a curve giving the volume determined by the blotting paper method as a function of the relative spacing between the emitter and the receiver, for a given blanket thickness.

FIG. 6 represents test results in the form of a curve giving the total effective volume determined by the blotting paper method as a function of the relative spacing between the emitter and the receiver.

Step 5: The effective amount of water that has interacted with the wave is determined by the formula $$H = Hr \cdot (G/E)/(1-Hr) \cdot V\text{eff} \qquad (2)$$

with:
H being the effective amount of water (in kg)
Hr being the relative humidity (in %)
G being the grammage (in kg/m$^2$)
E being the thickness of the blanket (in m)
Veff being the effective volume (in m$^3$)
Step 6: All of the results are compiled and a relationship of the following type is advantageously determined, for example by linear regression $$F = a' \cdot H + b' \cdot G + c' \cdot E + d' \cdot T + e' \cdot Ha + \delta' \qquad (1')$$

with:
F being the variation of the wave
H being the effective amount of water (in kg)
G being the grammage (in kg/m$^2$)
E being the thickness (in m)
T being the ambient temperature
Ha being the ambient humidity
This linear regression is typically carried out based on products, in other words a regression for a given combination of grammage/thickness/moisture in a defined range.

The processing unit 60 comprises calculation means 64 using these calibration data, and in particular the relationship (1') above, to calculate in real time, as a function of the thickness, of the grammage, of the ambient temperature and humidity, and of the variations of at least one parameter of the incident wave emitted by the emitter 44*c*, the effective amount of water actually passed through by the incident wave.

The process for quantifying the moisture in the blanket is finally carried out in the following manner:
When an incident wave is emitted by an emitter 44*c*, 44*d*, the corresponding receiver 46*c*, 46*d* acquires the signal corresponding to the transmitted wave, and determines the phase shift or the variation in amplitude of the wave. At the same time, the ambient temperature and humidity are measured by the sensors 50*c*, 50*d*; 52*c*, 52*d*. This information is sent to the data processing unit 60 which, with the aid of the calculation means 64, determines the effective amount of water.

After processing by the unit 60, the information on the moisture is transmitted to a control device 70 which is then capable of continuously and very quickly modifying at least one of the parameters acting on a step of the manufacturing process, for example via control lines 72, 74, 76. Said parameter may be, for example but nonlimitingly, the amount of binder injected, the initial composition of the mixture and in particular the amount of water present with the resin (control line 72), the temperature of the drying oven or the dwell time in the drying oven (line 76), the speed or flow rate of air of the drying oven, etc.

In the example illustrated, the presence of two measuring subassemblies 42*c*, 42*d* makes it possible to determine a right/left moisture difference in the blanket, and thus to evaluate the homogeneity of the production.

Advantageously, the two subassemblies are perfectly symmetrical relative to a median plane of the blanket. For example, the distance between the receivers 46*c*, 46*d* is advantageously identical to the distance d2 separating the two emitters 44*c*, 44*d*.

Also, advantageously, the distance d2 separating the two emitters 44*c*, 44*d* is chosen so as to prevent interferences between the waves emanating from each emitter (distance d3 between the effective volumes of the subassemblies 42*c*, 42*d* of greater than 0, see FIG. 3 or 4).

The invention claimed is:

1. A process for quantifying a moisture in a blanket of fibers, comprising:
   emitting an incident electromagnetic wave towards the blanket, by at least one emitter, receiving the electromagnetic wave transmitted through the blanket, by at least one receiver,
   identifying a variation of at least one parameter of the transmitted wave relative to the incident electromagnetic wave, wherein said parameter has been modified when the electromagnetic wave crosses the blanket, and
   determining a representative value of the moisture in the blanket of fibers, as a function of said variation and of an effective volume of blanket that has actually interacted with the incident electromagnetic wave, the effective volume of the blanket being defined by a thickness of the blanket and by an effective blanket cross-section that interacts with the electromagnetic wave.

2. The process as claimed in claim 1, wherein the incident electromagnetic wave is a microwave.

3. The process as claimed in claim 1, wherein a variation of one parameter of the transmitted wave relative to the incident electromagnetic wave is a phase shift.

4. The process as claimed in claim 1, wherein a variation of one parameter of the transmitted wave relative to the incident electromagnetic wave is a change in amplitude.

5. The process as claimed in claim 1, wherein the representative value of the moisture in the blanket of fibers corresponds to an actual amount of water that has interacted with the incident electromagnetic wave, referred to as effective amount of water.

6. The process as claimed in claim 5, wherein the effective amount of water is determined by means of a mathematical relationship giving the variation of one parameter of the transmitted wave relative to the incident electromagnetic wave as a function of at least the effective amount of water, a grammage, and the thickness of the blanket, wherein coefficients of said relationship are determined previously by regression from a series of measurements carried out with samples of known or measured relative humidity, thickness and grammage, the effective amount of water being a function of the effective volume of blanket that has actually interacted with the incident electromagnetic wave.

7. The process as claimed in claim 1, further comprising a measurement of a grammage of the blanket.

8. The process as claimed in claim 1, further comprising a measurement of the thickness of the blanket.

9. The process as claimed in claim 1, further comprising a measurement of the ambient humidity and/or ambient temperature.

10. The process as claimed in claim 1, comprising a prior calibration step for establishing a relationship between the variation of one parameter of the transmitted wave relative to the incident electromagnetic wave and an actual amount of water interacting with an incident electromagnetic wave passing through the blanket, referred to as effective amount of water, said relationship taking into account the effective volume of blanket that has actually interacted with the incident electromagnetic wave.

11. The process as claimed in claim 10, wherein the calibration step comprises a step of estimating, by tests or by numerical simulation, the effective volume of blanket interacting with the electromagnetic wave.

12. The process as claimed in claim 11, wherein the step of estimating the effective volume of blanket comprises a step of estimating, by tests or by numerical simulation, an effective blanket cross section interacting with the electromagnetic wave.

13. The process as claimed in claim 11, wherein the effective volume has a variable cross section over the entire thickness of the blanket.

14. The process as claimed in claim 11, wherein the effective volume has a general truncated cone or double truncated cone shape.

15. The process as claimed in claim 1, wherein the blanket of fibers is transported by a first transport member and by a second transport member separated from the first member by a measuring zone, and the emitter and the receiver are positioned respectively above and below the blanket, in said measuring zone.

16. The process as claimed in claim 1, wherein the blanket of fibers moves along a run plane and a run direction and at least two measuring subassemblies each comprising an emitter and a receiver are distributed in a lateral direction of the blanket orthogonal to the run direction and parallel to the run plane.

17. The process as claimed in claim 16, comprising determining a moisture difference between at least two zones of the blanket that are aligned in the lateral direction.

18. A process for manufacturing a product based on fibers bound by a binder, comprising a fiberizing step, a step of adding the binder, a step of collecting and conveying the binder-impregnated fibers, and a step of crosslinking the binder, the process further comprising, before the crosslinking step, a step of quantifying the moisture in the blanket of fibers, using the process as claimed in claim 1.

19. The process as claimed in claim 18, further comprising a step of regulating at least one parameter chosen from the composition of the binder, the amount of binder, the crosslinking temperature, the duration of the crosslinking step, or a speed or flow rate of air imposed during the crosslinking step, as a function of the quantified moisture of the blanket.

20. The process as claimed in claim 18, wherein the fibers are glass, rock, wood, cotton or hemp fibers.

21. The process as claimed in claim 17, wherein the at least two zones of the blanket are distributed on either side of a median plane of the blanket.

22. The process as claimed in claim 19, wherein the at least one parameter includes a proportion of water in the binder.

* * * * *